(12) United States Patent
Haire et al.

(10) Patent No.: US 7,549,650 B2
(45) Date of Patent: Jun. 23, 2009

(54) ICE BRAKE

(75) Inventors: Leonard Haire, Wasilla, AK (US); Daniel N. Russell, Willow, AK (US); Kenneth Wayne Johnson, Jr., Wasilla, AK (US)

(73) Assignee: Alaska Airboats, LLC, Wasilla, AK (US)

( * ) Notice: Subject to any disclaimer, the term of this patent is extended or adjusted under 35 U.S.C. 154(b) by 332 days.

(21) Appl. No.: 11/171,988

(22) Filed: Jul. 1, 2005

(65) Prior Publication Data

US 2007/0000418 A1    Jan. 4, 2007

(51) Int. Cl.
*B63H 25/44*    (2006.01)
(52) U.S. Cl. .................. 280/28.11; 114/170; 114/171; 188/8
(58) Field of Classification Search ................. 280/604, 280/605, 816, 809, 28.11; 188/8, 128
See application file for complete search history.

(56) References Cited

U.S. PATENT DOCUMENTS

| 1,055,883 | A | * | 3/1913 | Curwen | 188/8 |
|---|---|---|---|---|---|
| 1,244,460 | A | * | 10/1917 | Blaszczyk | 188/8 |
| 1,329,047 | A | * | 1/1920 | Hammerstrom | 188/8 |
| 1,429,995 | A | * | 9/1922 | Abramchuk | 188/8 |
| 1,613,508 | A | * | 1/1927 | Gardner | 188/8 |
| 1,879,432 | A | * | 9/1932 | Norton | 244/112 |
| 2,153,234 | A | * | 4/1939 | Buccella | 188/8 |
| 2,595,586 | A | * | 5/1952 | Lapointe | 280/604 |
| 3,202,437 | A | * | 8/1965 | Masbruch | 280/18 |
| 3,628,804 | A | * | 12/1971 | Carreiro | 280/18 |
| 3,861,492 | A | * | 1/1975 | Jensen, Sr. | 180/182 |
| 4,152,007 | A | * | 5/1979 | Smith | 280/605 |
| 4,219,214 | A | * | 8/1980 | Kostov | 280/605 |
| 4,320,905 | A | * | 3/1982 | Andrew et al. | 280/14.21 |
| 4,611,848 | A | * | 9/1986 | Romano | 296/98 |
| 4,784,427 | A | * | 11/1988 | Burgess | 296/98 |
| 4,932,839 | A | | 6/1990 | Pitchford | |
| 5,218,918 | A | | 6/1993 | Cline | |
| 5,253,437 | A | * | 10/1993 | Klebahn et al. | 36/122 |
| 5,344,167 | A | * | 9/1994 | Strouth | 280/14.1 |
| 5,509,683 | A | * | 4/1996 | Daniel | 280/605 |
| 5,673,772 | A | * | 10/1997 | Martin | 188/6 |
| 5,769,021 | A | | 6/1998 | Schad | |
| 6,116,622 | A | * | 9/2000 | Gibbons | 280/16 |
| 6,241,265 | B1 | | 6/2001 | Kovar et al. | |
| 6,283,254 | B1 | * | 9/2001 | Bibollet | 188/8 |
| 6,367,173 | B2 | * | 4/2002 | Lancon | 36/122 |
| 6,652,422 | B1 | * | 11/2003 | Day | 482/51 |

(Continued)

OTHER PUBLICATIONS www.windsled.com/husley.htm—available on or before Oct. 11, 2002 showing pictures taken on Feb. 5, 2002 with descriptions thereof.*

*Primary Examiner*—Christopher P Ellis
*Assistant Examiner*—Vaughn T Coolman

(57) ABSTRACT

An ice brake is presented that provides stopping traction on ice, snow, water, dirt, gravel, and solid ground. It is driven by a hydraulic ram to provide quick response. The brake has a blade with a bottom edge that has cutout portions to allow up to 50% debris accumulated by the brake to escape. This increases drag, because debris is forced to pass through these cutout sections. The brake is strong enough to apply sufficient loading force on ice to break a craft's hull free from being frozen down to ice, yet it is flexible enough to bend out of the way of rocks and other immovable objects.

11 Claims, 2 Drawing Sheets

U.S. PATENT DOCUMENTS

| | | |
|---|---|---|
| 6,840,523 B2 | 1/2005 | Kortuem |
| 6,905,128 B1 * | 6/2005 | Lear et al. .................... 280/16 |
| 7,007,621 B1 * | 3/2006 | Bootes .................. 114/145 R |
| 7,182,352 B1 * | 2/2007 | Gonzalez ............... 280/87.021 |
| 7,232,133 B2 * | 6/2007 | Stevens ...................... 280/16 |
| 2002/0084124 A1 * | 7/2002 | Cook et al. ................. 180/182 |
| 2005/0258609 A1 * | 11/2005 | Yeh ........................ 280/14.27 |

* cited by examiner

ICE BRAKE

BACKGROUND

The field of the instant inventive device is ice brake for airboats. The ice brakes of prior art have commonly shown various levers driven by a heel of an operator's boot, which rotate to drive either a pad or hooks into ice and snow. A long lever arm has been necessary to gain sufficient mechanical advantage, which has yielded a slow response time. No means has been shown to allow accumulated ice, snow and debris to escape instead of piling up in front of the brake. Riding up onto this accumulated debris has wasted much of the stopping force of ice brakes of prior art.

SUMMARY

The main object of the present invention is to satisfy a need for a brake with quick response time and excellent traction on ice, snow, water, dirt, gravel, and solid ground in all weather conditions. It is a further object to provide a means by which debris accumulated by the brake can pass away from in front of the brake, so that stopping force is not wasted by the craft riding up onto this piled up debris. It is a further object to provide a blade of a brake that is strong enough to apply sufficient loading force onto an ice substrate to break a hull of a craft free from being frozen down to the ice, and yet that is flexible enough to bend out of the way of rocks.

These and other objects are achieved according to the instant invention by a brake with a hydraulically driven blade that slides vertically parallel to a transom of a craft. The blade has cutout sections along a bottom edge that allow up to 50% of accumulated debris to escape. Hardened steel screws in the bottom edge of the blade further enhance traction on ice. The blade is built of at least one sheet of ultra high molecular weight plastic or cross-polymerized composite material, so that it is strong yet flexible upon striking immovable objects.

DESCRIPTION: PREFERRED EMBODIMENTS

Figure 1:
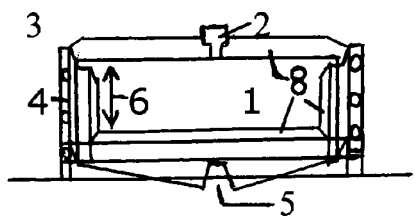
FIG. 1 is an ice brake having a blade with one cutout section.

The main feature of the present invention which contributes to the achievement of the objects of the invention in common with all embodiments is a flexible brake blade 1 driven to slide both up and down by a double acting ram means 2 shown in FIGS. 1-6 substantially parallel to a transom 3 of a craft such as an airboat, for example. The ram means 2 pushes and pulls, as indicated by the arrow 6, on a top edge of the blade 1 and provides a fast response time. The ice brake is attached to a transom 3 of a craft by vertical braces 4 made preferably of aluminum and bolted to the transom 3 so that the blade 1 is able to slide both up and down as shown by arrow 6 in FIGS. 1-5. The braces 4 include a liner 8 made preferably of ultra-high molecular weight polyethylene located on each side of blade 1 (shown best in FIG. 5 and in a top view in FIG. 6) through which blade 1 can slide. This liner prevents debris from depositing between the blade and transom. A preferred ram means 2 is a double acting hydraulic ram powered by a double acting hydraulic power pack, which provides sufficient loading force to lift and crack loose a craft from being frozen down to ice. For a 16 to 18 foot airboat an effective cylinder pressure rating has been found to be 1500 psi downward and 3000 psi upward, for example. Another example of a ram is an electric ram. Alternatively, a compressed air ram is used. Double acting rams are available from Alaska Airboats, P.O. Box 299030, Wasilla, Ak. 99629. Another feature of the instant invention in common with all embodiments is at least one cutout section 5 in a bottom edge of the brake blade 1, which allows preferably up to 50% of accumulated ice, snow, water, gravel and debris to escape rather than pile up in front of the blade 1. In this way a craft does not ride up on this accumulated debris and waste most of the stopping force of the brake, because the effective blade surface area is reduced by the craft riding up on this debris. The blade 1 is made of any solid substance selected from ultra-high molecular weight polyethylene, metal, any cross-polymerized composite, and any combination of these. A preferred ultra high molecular weight polyethylene is Tyvar 88®, and a preferred metal is hardened steel, and a preferred composite is Kevlar® bonded with epoxy. The blade 1 is flexible enough to flex out of the way of large rocks, ice ridges and other immovable objects, but stiff enough to provide excellent traction.

Figure 2:
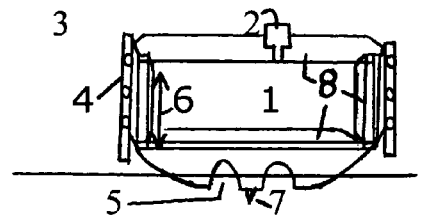
FIG. 2 is an ice brake having a blade with two cutout sections and a screw in a bottom edge.
Figure 3:
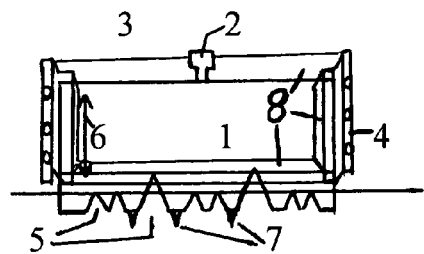
FIG. 3 is an ice brake having a plurality of cutout sections and screws in a bottom edge.
Figure 4:
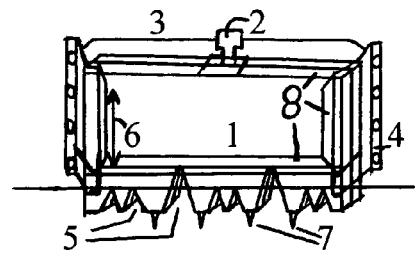
FIG. 4 is an ice brake having two blade sheets attached to each other.
Figure 5:
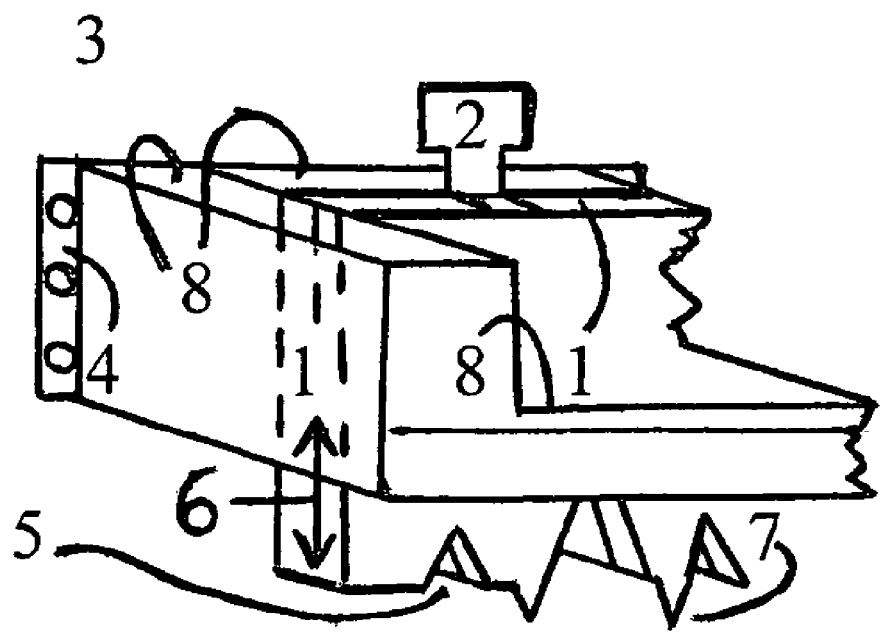
FIG. 5 is the ice brake of FIG. 4 turned 45° to the side.
Figure 6:
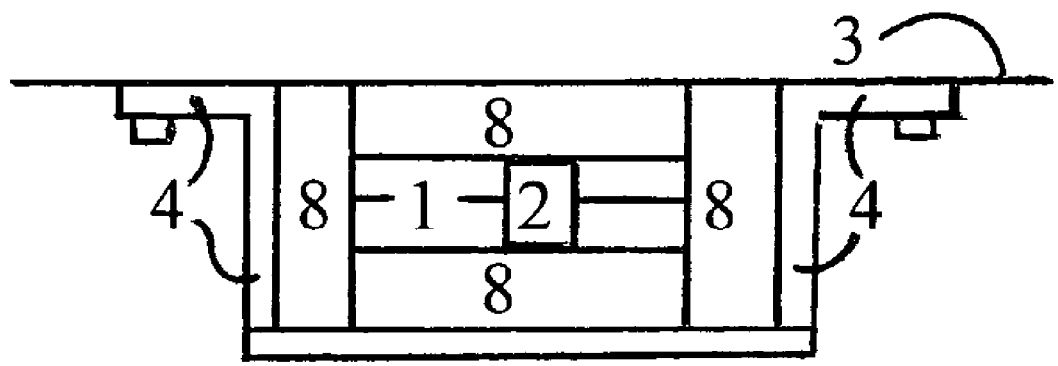
FIG. 6 is a top, cross-sectional view taken ¾ of the way down from the top of FIGS. 1-5.

A first embodiment shown in FIG. 1 is an ice brake having at least one cutout section 5 on a bottom edge of the blade 1. A second embodiment shown in FIG. 2 is an ice brake having two cutout sections 5 and at least one carbide steel screw 7 in the bottom edge of the blade 1. The carbide tipped screws are called "ice picks" and are in common use in snow-machines. Screws 7 are screwed vertically up into the bottom edge of the blade 1. The carbide tips of the screws 7 remain exposed to enhance traction in ice. A third embodiment is shown in FIG. 3 is an ice brake having a plurality of cutout sections 5 and screws 7 in the bottom edge of the blade 1. FIG. 4 shows a fourth embodiment of an ice brake having a blade 1 comprised of at least two sheets made of any solid substance attached to each other so they are substantially parallel. In one example of a two sheet combination one of the at least two sheets is made of a metal which stiffens the other sheet and a second sheet is made of ultra high molecular weight polyethylene. This combination further enhances traction in ice by forming a stiffer blade 1 with sharper teeth formed by cutout sections 5. In another example a fiber reinforced composite is sandwiched between two layers of plastic. This combination works better when the blade 1 contacts rocks or ice ridges. Preferably two of the cutout sections 5 are larger than all other cutout sections 5 as shown in FIGS. 3 and 4. This enhances braking in deep snow. Frictional drag developed from forcing snow, water, and debris through these cutout sections has been found to be much greater than that developed by a flat blade, because the cross-sectional surface area of the bottom edge of the blade 1 through which the snow passes is much greater than is the case with a flat edge and because the snow, water and debris behave as a fluid.

The flexible, vertically sliding, ram driven ice brake blade 1 and the cutout sections 5 on the bottom edge of the blade 1 are each novel features of the instant invention, however, the instant invention is also the combination of all of these features in a single unit construction of the ice brake. It is this combination which provides a low cost, quick response ice brake with superior traction and stopping force on ice, snow, water, debris and solid ground in a wide range of temperatures, environmental conditions, and speeds. Accordingly, for all these reasons set forth, it is seen that the ice brake of the present invention represents a significant advancement in the art of ice brakes and has substantial commercial merit.

While there is shown and described herein certain specific structures embodying the invention, it will be manifest to those skilled in the art that modifications may be made without departing from the spirit and the scope of the underlying inventive concept. Therefore, the present invention shall not be limited to the particular forms herein shown and described except by the scope of the appended claims.

What is claimed is:

1. An ice brake comprising a flexible blade having a bottom edge and a top edge, said blade being held to a transom of a craft by braces that allow said brake to slide up and down, said braces including a liner located on each side of said blade through which said blade can slide against said liner, said top edge being attached to and being driven up and down by a double-acting ram means, said ram means providing sufficient force to lift and crack loose said craft from being frozen down to ice, said bottom edge having at least one cutout section, and said cutout section allowing ice, snow, water, gravel, and debris accumulated by said brake to escape from in front of said blade.

2. The brake according to claim 1 wherein said blade is made of a solid substance selected from the group consisting of ultra high molecular weight polyethylene, metal, and cross-polymerized composite, and said liner is made of a plastic.

3. The brake according to claim 2 wherein said blade has at least one carbide steel screw screwed vertically through said bottom edge of said blade, a head of said screw is an ice spike, and said head of said screw is exposed to enhance traction.

4. The brake according to claim 2 wherein said braces are aluminum and are bolted into said transom, and said plastic is ultra high molecular weight polyethylene.

5. The brake according to claim 2 wherein said at least one cutout section is a plurality of cutout sections, and at least two of said plurality of cutout sections are larger than all other said cutout sections.

6. The brake according to claim 2 wherein said blade is made of at least two sheets, each of said sheets is made of a different said solid substance, and said sheets are attached to each other such that said sheets are substantially parallel to each other.

7. The brake according to claim 3 wherein said at least one cutout section is a plurality of cutout sections, and at least two of said plurality of cutout sections are larger than all other said cutout sections.

8. The brake according to claim 7 wherein said blade is made of at least two sheets, each of said sheets is made of a different said solid substance, and said sheets are attached to each other such that said sheets are substantially parallel to each other.

9. An ice brake comprising a flexible blade having a bottom edge and a top edge, said blade being held to a transom of a craft by braces that allow said brake to slide up and down, said braces including a liner located on each side of said blade through which said blade can slide against said liner, said top edge being attached to and being driven up and down by a double-acting ram means, said ram means providing sufficient force to lift and crack loose said craft from being frozen down to ice, said bottom edge having at least one cutout section, said cutout section allowing ice, snow, water, gravel, and debris accumulated by said brake to escape from in front of said blade, said blade being made of at least two sheets, each of said sheets being made of a different solid substance, and said sheets being attached to each other such that said sheets are substantially parallel to each other.

10. The ice brake according to claim 9 wherein said blade has at least one screw, said screw is screwed vertically through said bottom edge of said blade, a head of said screw is an ice spike, and said head of said screw is exposed to enhance traction.

11. The ice brake according to claim 9 wherein said at least one cutout section is a plurality of cutout sections, and at least two of said plurality of cutout sections are larger than all other said cutout sections.

* * * * *